United States Patent [19]

Shibayama

[11] Patent Number: 5,050,044

[45] Date of Patent: Sep. 17, 1991

[54] FLASH DEVICE

[75] Inventor: Yoshinobu Shibayama, Kanagawa, Japan

[73] Assignee: Canon Kabushiki Kaisha, Tokyo, Japan

[21] Appl. No.: 552,845

[22] Filed: Jul. 16, 1990

Related U.S. Application Data

[63] Continuation of Ser. No. 356,601, May 25, 1989, abandoned, which is a continuation of Ser. No. 50,519, May 18, 1987, abandoned.

[30] Foreign Application Priority Data

| May 21, 1986 | [JP] | Japan | 61-117107 |
| May 21, 1986 | [JP] | Japan | 61-117108 |
| Apr. 15, 1987 | [JP] | Japan | 62-92417 |
| Apr. 15, 1987 | [JP] | Japan | 62-92418 |

[51] Int. Cl.⁵ ............................................. G03B 15/05
[52] U.S. Cl. ..................... 362/18; 362/285; 354/149.1
[58] Field of Search ............... 362/18, 285, 16, 174, 362/176; 354/149.1, 145.1

[56] References Cited

U.S. PATENT DOCUMENTS 2,906,862  9/1959  McCammon ............... 354/149.1 X
4,404,618  9/1983  Yamada et al. ..................... 362/17

FOREIGN PATENT DOCUMENTS 504464   8/1930  Fed. Rep. of Germany ...... 362/285
112507   1/1918  United Kingdom ............... 362/285
644889  10/1950  United Kingdom ............... 362/285

Primary Examiner—Allen J. Flanigan
Attorney, Agent, or Firm—Fitzpatrick, Cella, Harper & Scinto

[57] ABSTRACT

A flash device which includes a light emitting portion, a reflector for reflecting a light emitted by the light emitting portion, an apparatus for producing relative movement between the light emitting portion and the reflector and an electrical conductive member made of elastic material which is connected through a conductive path formed on an inside surface of the reflector to the light emitting portion in order to feed a trigger voltage for energizing the light emitting portion.

15 Claims, 7 Drawing Sheets

FLASH DEVICE

This application is a continuation of application Ser. No. 356,601 filed on May 25, 1989, which is a continuation of application ser. No. 050,519 filed on May 18, 1987, both applications now abandoned.

BACKGROUND OF THE INVENTION

1. Field of the Invention

The present invention relates to a flash device and, more particularly, it relates to a flash device including a light emitting portion and a reflector for reflecting a light emitted by said light emitting portion in which the light emitting portion and the reflector are arranged to make relative movement with respect to each other, thereby varying an illumination angle of the light emitted by the light emitting portion

2. Description of the Related Art

In a known electronic flash device, which has been well known in the art, a light emitting portion and a reflector for reflecting light emitted by said light emitting portion are so arranged that they cannot make relative movement with respect to each other and a mesa coating formed on an outside surface of the light emitting portion is pressed against an aluminum surface deposited on an inside surface of the reflector, whereby a trigger voltage applied to a trigger terminal fixed on the reflector is fed to the the light emitting portion through a connection formed between the light emitting portion and the reflector.

In the electronic flash device having such construction, the illuminating angle of the flash light is always constant, irrespective of the photographing condition, so that the allowable range of flash photographing is narrow. This is a problem inherent in the conventional flash device.

Recently, an electronic flash device in which a light emitting portion and a reflector are arranged to make relative movement with respect to each other along its optical axis, thereby enabling a variation in an illuminating angle of the flash device has been proposed and a plan to carry out such flash device is now being developed. In such an electronic flash device having variable illuminating angle, the light emitting portion is designed to make relative movement with respect to the reflector and, consequently, it is required to design a novel construction of the electrical connection to apply the trigger voltage to the light emitting portion, which is entirely different from that of the conventional electronic flash device. Up to the present, a construction as hereinafter described, for example, has been proposed. This construction employs a lead wire for applying the trigger voltage, which is wound, at its one end portion, onto the mesa coating of the light emitting portion and is connected, at its other end portion, to the trigger terminal fixed on the outside surface of the reflector. The lead wire has a length which is at least equal to the distance of displacement of the light emitting portion from its initial position to its most advanced position. Such construction, however, has a defect described below. That is, according to such construction, the lead wire is designed to be moved into the interior of the reflector and, consequently, there is a danger that the lead wire may come into contact with the inside surface of the reflector or the lead wire may be adversely affected by the reflected heat or the radiating light.

SUMMARY OF THE INVENTION

It is an object of the present invention to eliminate the defects of the conventional flash device as described above.

In order to attain the object as described above, the present invention provides a flash device in which a light emitting portion and a reflector for reflecting a light emitted by said light emitting portion are arranged to make relative movement with respect to each other, which includes a light emitting portion, a reflector for reflecting a light emitted by the light emitting portion, means for producing relative movement between the light emitting portion and the reflector and an electrical conductive member made of elastic material which is connected through a conductive path formed on an inside of the reflector to the light emitting portion in order to apply a trigger voltage for energizing the light emitting portion, whereby the light emitting portion and the trigger terminal can be connected with each other, without using a lead wire.

The other objects of the present invention will be understood from the description of the preferred embodiments of the invention which will be explained with reference to the drawings.

DETAILED DESCRIPTION OF THE PREFERRED EMBODIMENTS

Now, the preferred embodiments of the present invention will be described, with reference to the drawings.

Figure 1:
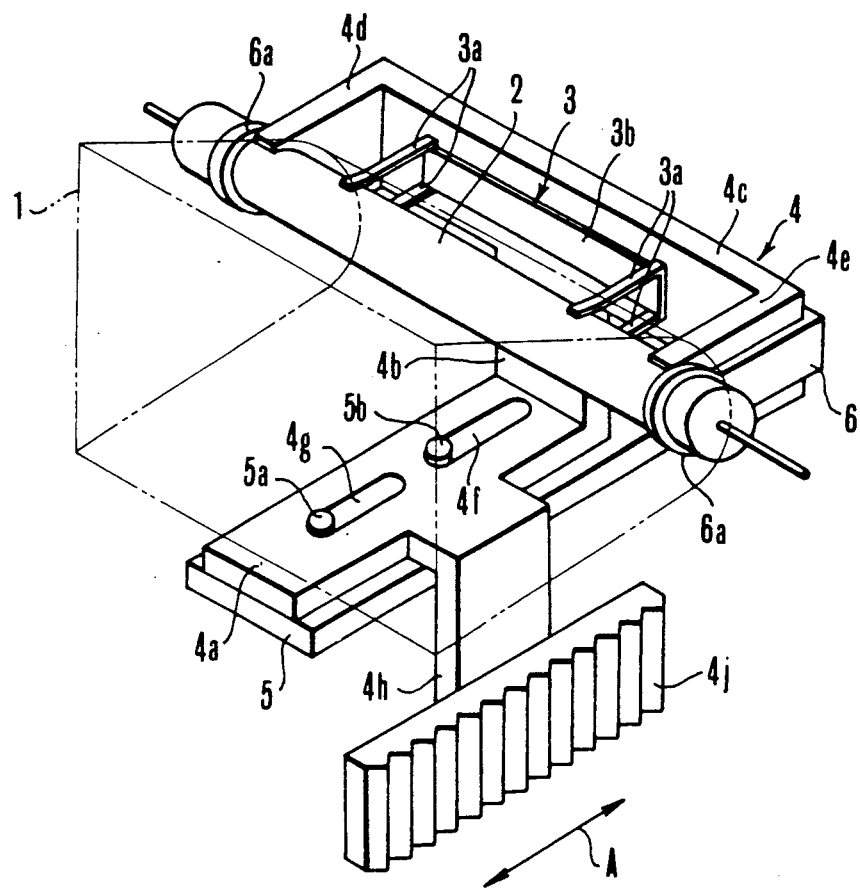
FIG. 1 is a perspective view showing a first embodiment of the electronic flash device according to the present invention.
Figure 2:
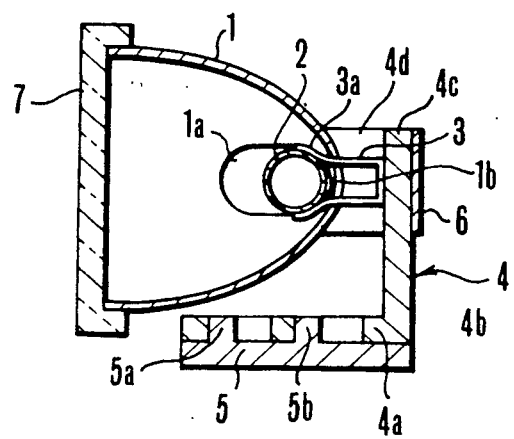
FIG. 2 is a longitudinal sectional view of the device shown in FIG. 1, taken along a center thereof.

FIGS. 1 and 2 illustrate the first embodiment of the electronic flash device according to the present invention, which includes a reflector 1 which is formed with a paraboloidal wall at its upper and lower portions and parallel vertical walls at its both side portions, as shown in FIG. 2. Slots 1a extending in axial direction of the reflector are formed in the both side walls thereof, as shown in FIG. 2. A long slot opening 1b having a height smaller than that of the slot 1a is formed in the rear end wall of reflector 1 and extends throughout the width thereof (see FIG. 2).

A cylindrical light emitting tube 2 is housed in the reflector 1 and extends in parallel with the upper and lower walls thereof. Both ends of light emitting tube 2 extend outwardly of the reflector through said slots 1a. The height of slot 1a is slightly larger than the outer diameter of the light emitting tube 2, so that the light emitting tube 2 can be moved in axial direction of the reflector 1, without making sliding contact with the inside surface of the slots 1a.

Both ends of the light emitting tube 2 projecting outwardly through both side walls of the reflector 1 are fitted with ring portions 6a formed at ends of a belt-shaped holding rubber member 6. The belt portion of said holding rubber member 6 is fixed, in its longitudinally stretched state, on an outside peripheral surface of a frame portion 4c of an emitting tube support 4, which will be hereinafter described. Thus the light emitting tube 2 is supported on the light emitting tube support 4 by holding rubber member 6.

The light emitting tube support 4 and the holding rubber member 6 cooperate to constitute a light emitting tube supporting structure. Light emitting tube support 4 includes a horizontal sliding portion 4a extending in the axial direction of the reflector, a vertical portion 4b standing from the rear end of sliding portion 4a, and a frame portion 4c integrally formed at the upper end of vertical portion 4b. Sliding portion 4a is slidable in axial direction of the reflector (as indicated by an arrow A in FIG. 1) on a base 5 fixed on light emitting tube support 4. Sliding portion 4a has two slots 4f and 4g formed therein, the slots extending in axial direction and being aligned on a line. Pins 5a and 5b projecting from the base 5 are arranged to fit into these slots 4f and 4g, respectively, so that the sliding portion 4a is slidable on the base 5 in the direction as indicated by A (i.e. axial direction) under guidance of pins 5a and 5b.

The frame portion 4c has a transverse part extending in the transverse direction (namely, direction in parallel with the light emitting tube 2) and two arms 4d and 4e extending forwardly from both ends of the transverse part in parallel with each other. Arms 4d and 4e are formed, at their forward ends, with semi-circular recesses (not shown) for receiving the ends of the light emitting tube 2. The light emitting tube 2 is supported at the recesses and urged against the recesses under the action of the tension of the holding rubber member 6.

A noninflammable electrical connecting member 3, made of leaf spring, for applying a trigger voltage to the light emitting tube 2 is disposed in a space surrounded by the frame portion 4c and the light emitting tube 2. Electrical connecting member 3 has a plate-shaped base portion 3b fixed on the front surface of the transverse part of the frame portion 4c and four arms 3a projecting forwardly from the both ends of base portion 3b. The four arms 3a formed on the both ends of base portion 3b are elastically pressed, at their forward ends, to a mesa coating formed on the outside surface of said light emitting tube 2. A trigger circuit (not shown) is connected to the base portion 3b of the electrical connecting member 3, so that a trigger voltage is fed from the trigger circuit through electrical connecting member 3 to the mesa coating of the light emitting tube 2. The vertical distance between the upper and lower arms of the electrical connecting member 3 is smaller than the vertical size of the slot opening formed in the rear end wall of the reflector 1, so that electrical connecting member 3 can move into the inside of the reflector 1 through the slot opening.

A leg portion 4h projects downwardly from one side edge of the sliding portion 4a and an axially extending lever portion 4j is fixed to the lower end of leg portion 4h. The lever portion 4j serves to displace the light emitting tube support 4 to a predetermined position, where a pawl or the like formed on a stopper member (not shown) is arranged to come into engagement with an engaging portion (not shown) formed on lever portion 4j to stop the light emitting tube support at any axial position.

The reflector 1 has a protector 7 fitted at the forward end thereof and it is fixed, with the reflector 1, on the base 5.

In the electronic flash device as shown in the drawings, which constitutes the flash device according to the present invention, the support 4 which serves to hold the light emitting tube 2 is slidable on the base 5 in axial direction, so that the light emitting tube 4 held by support 4 is movable in the axial direction of the reflector along the slots 1a. The noninflammable electrical connecting member 3, made of leaf spring, for applying the trigger voltage to the light emitting tube 2 serves to elastically hold the mesa coating of the light emitting tube 2 by its four arms 3a. The base portion 3b of the electrical connecting member is fixed on the frame portion 4c and the trigger circuit for applying the trigger voltage to the light emitting tube 2 is connected to base portion 3b. Such a construction has advantages over the conventional construction using a lead wire to connect the mesa coating of the light emitting portion with the trigger terminal in that there is no danger owing to the flexure of the lead wire or the like and the electrical connecting member 3 cannot come into contact with the reflector 1. Thus, the electrical connecting member 3 can constantly feed the trigger voltage to the light emitting tube 2 and safely apply the trigger voltage to the light emitting tube 2, while no trouble can occur owing to damage of the lead wire or the like.

Figure 3:
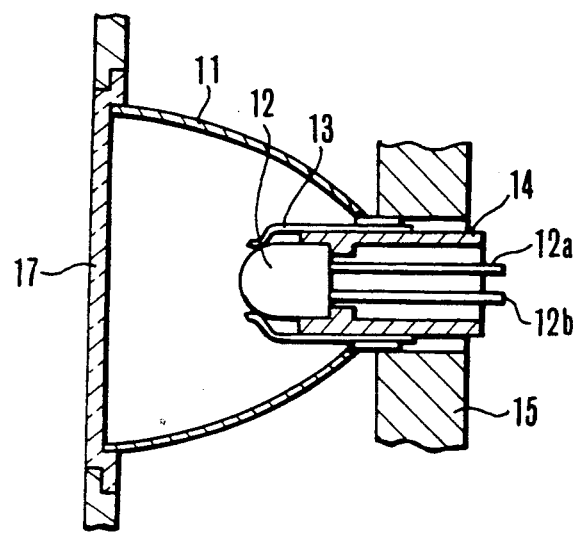
FIG. 3 is a longitudinal sectional view showing a second embodiment of the electronic flash device according to the present invention, taken along a center thereof.
Figure 4:
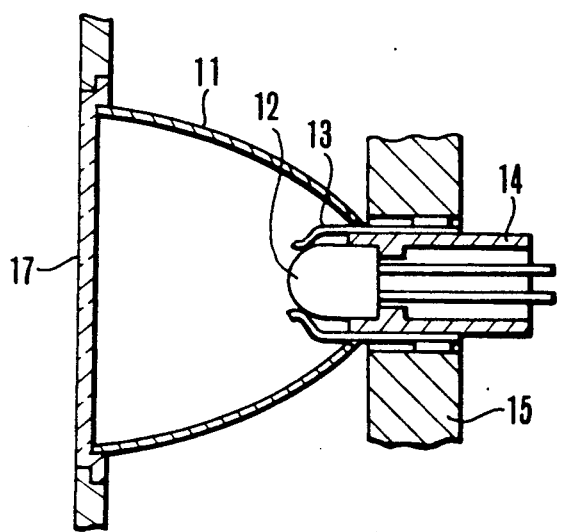
FIG. 4 is a similar longitudinal sectional view of the device shown in FIG. 3, illustrating its narrowest illuminating angle state.

FIGS. 3 and 4 illustrate the second embodiment of the present invention. The flash device as shown in a FIGS. 3 and 4 includes a reflector 11 in substantially rotation-symmetric shape having a symmetry axis on an optical axis of light emitted by a light emitting portion 12 in a dome shape, the light emitting portion having a mesa coating on its surface. The light emitting portion 12 has terminals 12a and 12b which are connected to an electronic flash circuit (not shown). A noninflammable electrical connecting member 13 made of a leaf spring is elastically pressed, at its one end, to the surface of the light emitting portion and it is connected, at its other end, to a trigger circuit.

The light emitting portion 12 is held by a supporting member 14, and the light emitting portion 12 and the electrical connecting member 13 are fixedly held in position as shown in FIGS. 3 and 4 by means of adhesive material or the like. A fixing member 15 has a hole and the supporting member 14 is inserted into the hole and guided thereby in axial direction. A protector 17 is fixed together with the reflector 11 on a base (not shown) of the flash device.

According to the construction as described above, the supporting member 14 for supporting the light emitting portion 12 is guided by the guiding hole formed in the fixing member 15 and is slidable in an axial direction through the guiding hole. FIG. 3 shows the state where the light emitting portion has been moved to its most advanced position and FIG. 4 shows the state where the light emitting portion has been moved to its most retracted position. At the most advanced position and the most retracted position the supporting member 14 is held stationary by an engaging member (not shown). The light emitting portion 12 can be moved with the supporting member 14 in the axial direction and during movement the electrical connecting member 13 is constantly and elastically pressed into contact with the light emitting portion 12, so that the light emitting portion 12 and the electrical connecting member 13 are moved as an integral unit. Accordingly, it is possible to feed a trigger voltage to the light emitting portion 12 in a stable manner, by applying the trigger voltage from a trigger circuit to one end of the electrical connecting member 3.

Figure 5:
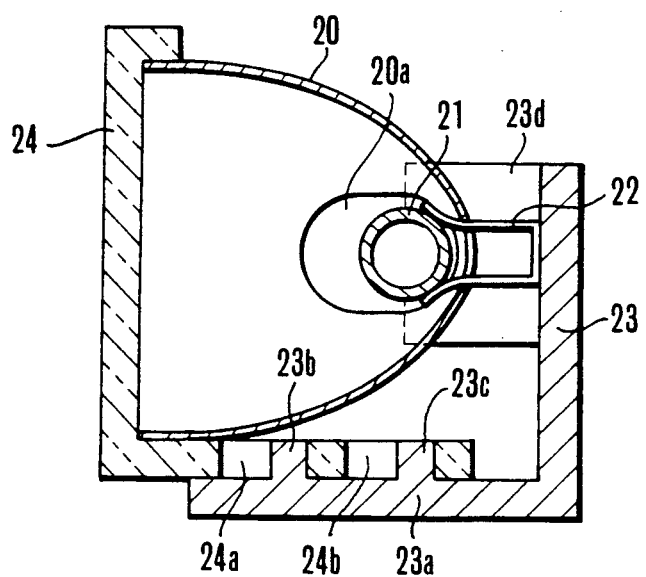
FIG. 5 is a longitudinal sectional view showing a third embodiment of the electronic flash device according to the present invention, taken along a center thereof.
Figure 6:
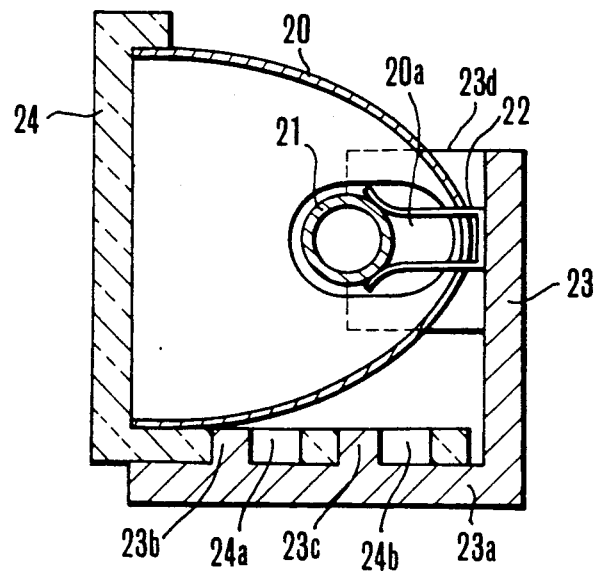
FIG. 6 is a similar longitudinal sectional view of the device shown in FIG. 5, illustrating its broadest illuminating angle state.

FIGS. 5 and 6 illustrate the third embodiment of the present invention. The flash device according to the third embodiment includes a reflector 20 having upper and lower surfaces which form a parboloid and side surfaces in each of which an axially extending slot 20a is formed. A long slot opening is formed in the rear end wall of the reflector 20 and the slot opening extends throughout the width of the reflector and has a vertical size smaller than that of said slot 20a.

A cylindrical light emitting portion 21 is housed in the reflector 20 and extends in parallel with the upper and lower surfaces of the reflector 20. Each end of the light emitting portion 21 projects outwardly of the reflector 20 through the slot 20a. The vertical size of slot 20a is slightly larger than the size of the outer diameter of the light emitting portion 21, so that the light emitting portion 21 can move in the axial direction of the reflector 20 along the slots 20a, without making sliding contact with the inside of slots 20a.

A supporting member 23 for supporting the light emitting portion is fixedly held on a fixed portion of the flash device body or the like and a horizontal portion 23a of supporting member 23 has pins 23b and 23c projecting therefrom. The supporting member 23 further includes a transverse part extending in the transverse direction (in parallel with the light emitting portion 21) and two parallel arms 23d projecting forwardly from both ends of said transverse part. Each of the arms 23d has a recess formed therein and the light emitting portion 21 is supported at the recesses of the arms and fixed thereto by means of a fixing rubber member or the like. A noninflammable electrical connecting member 22 made of leaf spring is disposed between the supporting member 23 and the light emitting portion 21 inside the reflector 20, and electrical connecting member 22 is elastically pressed, at its one end, to the mesa coating formed on the surface of the light emitting portion 21 and fixed, at its other end, to the supporting member 23.

A trigger circuit (not shown) is connected to electrical connecting member 22, so that the trigger voltage is applied through the electrical connecting member to the mesa coating of the light emitting portion 21.

A protector 24 made of transparent material is fixed to the reflector 20. Slots 24a and 24b aligned on a line are formed in a horizontal part of the protector 24, so that the protector is slidable in the axial direction while it is guided by sliding engagement of the pins 23b and 23b of the supporting member 23 with slots 24a and 24b.

By the axial movement of the protector 24, the reflector 20 is moved relatively to the light emitting portion 21, whereby the illuminating angle of the electronic flash device is varied.

As described above, the electronic flash device as shown in FIGS. 5 and 6 is so arranged that the protector 24 holding the reflector 20 is movable in the axial direction on the supporting member 23 and the reflector 20 held by protector 24 is movable in the axial direction along the slots 20a relative to the light emitting portion 21. The nonimflammable electrical connecting member 22, made of a leaf spring, for feeding the trigger voltage to the light emitting portion 21 serves to elastically hold the mesa coating of the light emitting portion 21 and the member is fixed to a fixing part of the supporting member 23, to which the trigger circuit for feeding the trigger voltage to the light emitting portion 21 is connected. Accordingly, the electrical connecting member 22 acts to constantly feed the trigger voltage to the light emitting portion 21 in the stable manner, within making contact with the reflector 20 even when the reflector 20 is moved relative to the light emitting portion 21.

Figure 7:
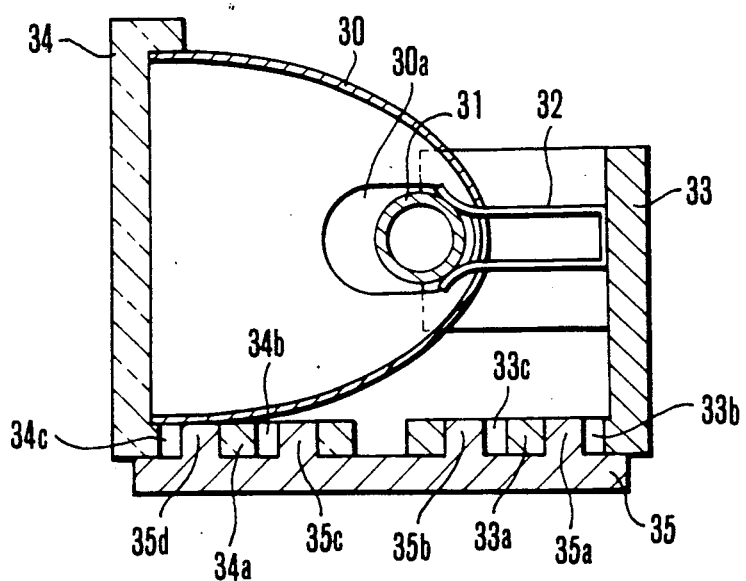
FIG. 7 is a longitudinal sectional view showing a fourth embodiment of the electronic flash device according to the present invention, taken along a center thereof.

FIG. 7 illustrates the fourth embodiment of the present invention. The flash device according to the fourth embodiment includes a reflector 30 and a protector 34, reflector 30 being held by protector 34 in the same manner as in the third embodiment as described above. A light emitting portion 31 is supported by a supporting member 33 in such a state that it passes through slots 30a formed in the reflector 30, and it is fixedly held by means of a fixing rubber member or the like, in the same manner as in the above-described embodiment. The light emitting portion 31 is movable in the axial direction along the slots 30a.

A noninflammable electrical connecting member 32 made of a leaf spring is disposed between the supporting member 33 and the light emitting portion 31 within the reflector 30 and electrical connecting member 32 is elastically pressed, at its one end, against a mesa coating formed on the surface of the light emitting portion 31 and it is fixed, at its other end, to the supporting member 33. A trigger circuit (not shown) is connected to the electrical connecting member.

The supporting member 33 has a horizontal part 33a in which slots 33b and 33c are formed in aligned relation on a line. The protector 34 has a horizontal part 34a in which slots 34b and 34c are formed in aligned relation on a line.

A fixing member 35 is fixed on the flash device body and it has pins 35a and 35b and pins 35c and 35d formed thereon.

Pins 35a and 35b fit in the slots 33b and 33c formed in the supporting member 33 while pins 35c and 35d fit in the slots 34b and 34c formed in the protector 34, whereby the supporting member 33 is slidable in the axial direction under the guidance of the pins 35a and 35b while the protector 34 is slidable in the axial direction under guidance of the pins 35c and 35d. The supporting member 33 and the protector 34 are connected with each other by a connecting member (not shown), so that one of them is moved for a predetermined distance when the other is moved. These two movable members can be stopped at predetermined positions in the axial direction by stopping means (not shown). It is possible to stop them at any position between the front and rear predetermined positions. In the construction of the electronic flash device as described above, when the light emitting portion 31 is moved with the supporting member 33, the light emitting portion 31 and the reflector 30 are associated with each other so that when the light emitting portion 31 is moved with the supporting member 33 in the forward direction the reflector 30 is moved with the protector 34 in the rearward direction and vice versa. The trigger voltage can be always fed to the light emitting portion 31 through the electrical connecting member 32, irrespective of the illuminating angle of the light emitting portion 31.

Figure 8:
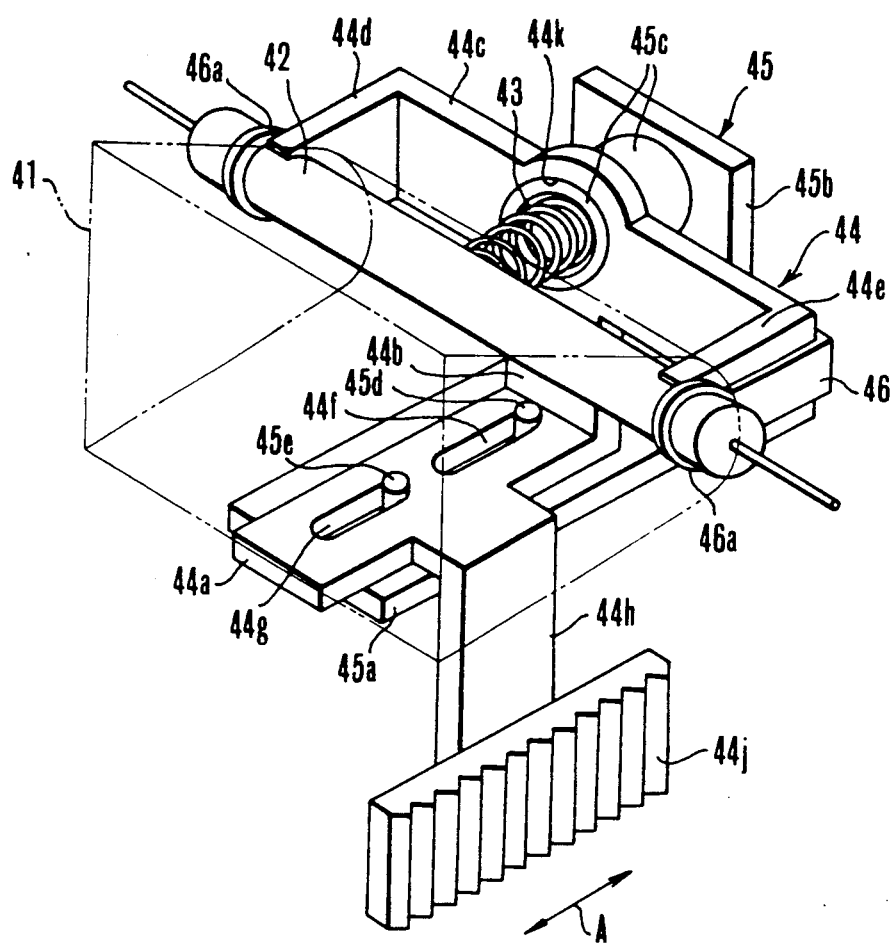
FIG. 8 is a perspective view showing a fifth embodiment of the electronic flash device according to the present invention.
Figure 9:
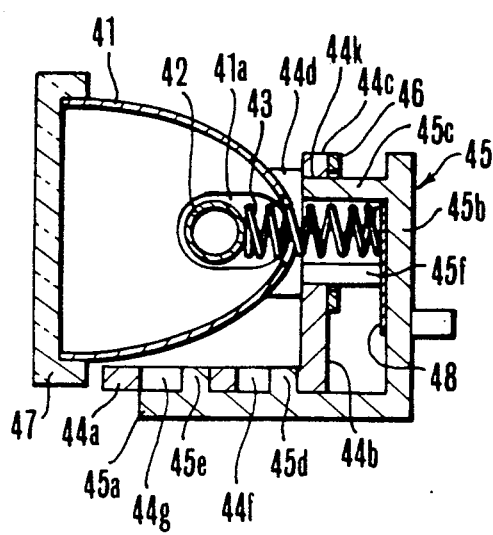
FIG. 9 is a longitudinal sectional view of the device shown in FIG. 8 in which the light emitting tube has been moved to its most advanced position relatively to the reflector.
Figure 10:
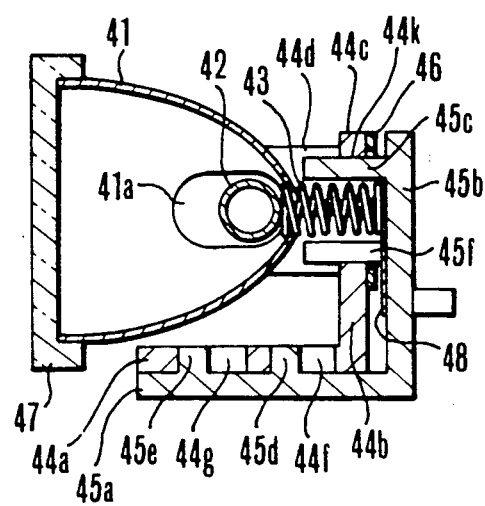
FIG. 10 is a longitudinal sectional view of the same device in which the light emitting tube has been moved to its most retracted position relatively to the reflector.

FIGS. 8-10 illustrate the fifth embodiment of the present invention. The flash device according to the fifth embodiment includes a reflector 41 having upper and lower surfaces in the form of a paraboloid and parallel vertical side surfaces. An axially extending slot 41a is formed in each of the side surfaces, as shown in FIG. 9. A circular opening is formed at substantially central position of a rear end surface of said reflector 41 (see FIG. 9) and an electrical connecting spring member 43, which will be hereinafter described, extends through said circular opening.

A cylindrical light emitting tube 42 is disposed in the reflector 41 and extends in parallel with the upper and lower surfaces of the reflector. Each end of light emitting tube 42 projects outwardly of the reflector 41 through the slots 41a. The vertical of said slots 41a is slightly larger than the size of the outer diameter of the light emitting tube 42, so that the light emitting tube 42 can move in forward and backward directions in the reflector 41 along the axially extending slots 41a, without making sliding contact with the insides slots 41a.

The both ends of the light emitting tube 42 projecting outwardly of the both sides of the reflector 41 are fitted with ring portions 46a formed at both ends of a belt-shaped holding rubber member 46. The belt portion of holding rubber member 46 is fixed, in its longitudinally stretched state, on an outside peripheral surface of a frame portion 44c of an emitting tube support 44, which will be hereinafter described. Thus the light emitting tube 42 is supported on the support 44 by holding rubber member 46.

The light emitting tube support 44 and the holding rubber member 46 cooperate to constitute a light emitting tube supporting structure. Light emitting tube support 44 includes a horizontal sliding portion 44a extending in the axial direction, a vertical portion 44b standing from the rear end of sliding portion 44a and a frame portion 44c integrally formed at the upper end of vertical portion 44b. Sliding portion 44a is slidable in the axial direction (as indicated by an arrow) on a base 45 fixed on the light emitting portion support 44. Sliding portion 44a has slots 44f and 44g formed therein, said slots extending in the axial direction and being aligned on a line. Pins 45d and 45e projecting from a horizontal portion 45a of the base 45 are arranged to fit into these slots 44f and 44g, respectively, so that said sliding portion 44a is slidable direction as indicated by the, arrow (in forward and backward directions) under the guidance of pins 45d and 45e.

The frame portion 44c has a transverse part extending in the transverse direction (namely, direction in parallel with the light emitting tube 42) and two arms 44d and 44e extending forwardly from both ends of the transverse part in parallel with each other. Arms 44d and 44e are formed, at their forward ends, with semi-circular recesses for receiving the ends of the light emitting tube 42. The light emitting tube 42 is supported at the recesses and pressed against the recesses under the action of the tension of the holding rubber member 46.

An opening 44k is formed at the central portion of the transverse part of the frame and the opening freely receives an entering portion in the form of a cylindrical projection 45c of a base 45, which will be hereinafter described.

The base 45 forms a stationary member relative to the light emitting tube support 44. The base 45 has a horizontal portion 45a for supporting the light emitting tube support 44, a vertical portion 45b positioned rearwardly of the vertical portion 44b of the light emitting tube support 44 and a cylindrical projection 45c projecting forwardly from the front surface of the vertical portion 45b, and the pins 45d and 45e project on the horizontal portion 45a, as described above. The size of the outside diameter of the cylindrical projection 45c is smaller than the diameter of the opening 44k formed in the light emitting tube support 44, so that the cylindrical projection 45c passes through the opening 44k, without friction. The outside surface of said cylindrical projection 45c is formed, at its lowermost part, with a cut part 45f (see FIGS. 9 and 10), through which the space within the cylindrical projection 45c communicates with the outer space. In cylindrical projection 45c is arranged a noninflammable electrical connecting spring member 43 formed by a coil spring having an outside diameter smaller than an inside diameter of said cylindrical projection. The electrical connecting member 43 is elastically pressed, at its forward end, against a mesa coating formed on the outside surface of the light emitting tube 42 disposed in the reflector 41. Electrical connecting member 43 is pressed, at its rear end, against an electrical conductive piece 48 fixed on the inside end surface of the cylindrical projection 45c (that is, the front surface of the vertical portion 45b). Electrical conductive piece 48 extends from the inside of the cylindrical projection 45c through said cut part 45f to the outside of the cylindrical projection 45c, where it is connected to a trigger terminal (not shown). Accordingly, a trigger voltage can be fed from the trigger terminal (not shown) through the electrical conductive piece 48 and electrical connecting spring member 43 to the light emitting member 42.

The light emitting tube support 44 is provided with means for stopping the light emitting tube 42 at a predetermined position relative to the reflector 41, which is associated with the sliding portion 44a and is constructed as hereinafter described. That is, a leg portion 44h projects downwardly from one side edge of the sliding portion 44a and an axially extending lever portion 44j is fixed to the lower end of said leg portion 44h. The lever portion 44j constantly receives a force acting to push the light emitting tube 42 together with the light emitting tube support 44 in the forward direction, under the action of the electrical connecting spring member 43. Thus, the light emitting tube 42 is constantly pushed and positioned to its most forward position within its movable range in the reflector 41. The lever portion 44j is arranged to move the light emitting tube support 44 to a predetermined position, where a pawl or the like formed on a stationary member (not shown) comes into engagement with the lever portion 44j to stop the light emitting tube 44 at any rearward position. The reflector 41 has a protector 47 fitted at the forward and thereof, which is fixed with the reflector 41 on the base 45.

In the electronic flash device as shown in FIGS. 8-10, the light emitting tube support 44 holding the light emitting tube 42 can be moved on the horizontal portion 45a of the base 45 from the forward position where base 45 is pushed by the electrical connecting spring member to any rearward position, so that the light emitting tube 42 supported by support 44 can move the in axial direction in the reflector 41 along the slots 41a. The electrical connecting spring member 43 for feeding the trigger voltage to the light emitting tube 42 contacts with the mesa coating of the light emitting tube and the base 45, which is a stationary member, and the trigger circuit for applying the trigger voltage to the light emitting tube 42 is connected to the electric conductive piece 48 which engages with said connecting member 43, so that the trigger voltage can be constantly fed through connecting member 43 to the light emitting tube 42 even when the light emitting tube 42 is moved in the forward or rearward direction in the reflector 41. Furthermore, the light emitting tube 42 is always pressed to the most forward position in the movable range under the action of the electrical connecting spring member 43, so that the light emitting tube 42 can be positioned at any predetermined position.

Figure 11:
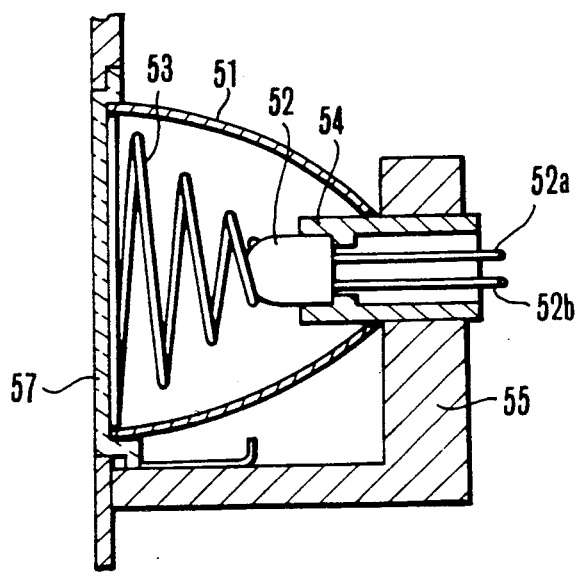
FIG. 11 is a longitudinal sectional view showing a sixth embodiment of the electronic flash device according to the present invention, taken along a center thereof.
Figure 12:
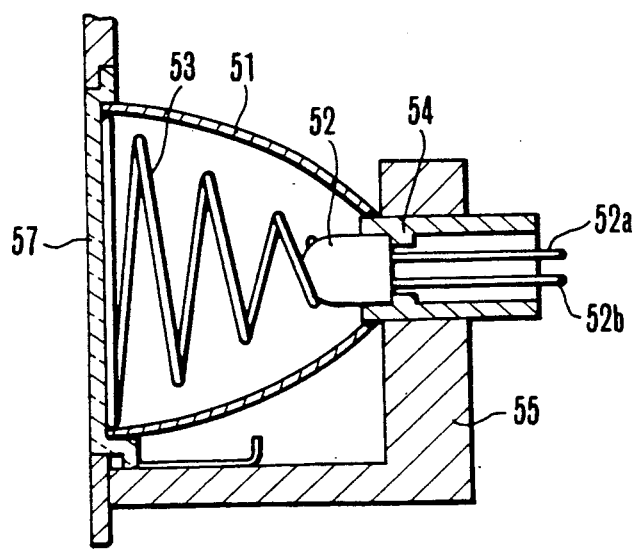
FIG. 12 is a similar longitudinal sectional view of the device shown in FIG. 11, illustrating its narrowest illuminating angle state.

FIGS. 11 and 12 illustrated the sixth embodiment of the present invention. The flash device as shown in FIGS. 11 and 12 includes a reflector 51 in a substantially rotation-symmetric shape having a symmetry axis on an optical axis of light emitted by a light emitting portion 52 in a dome shape, the light emitting portion having a mesa coating on its surface. The light emitting portion 52 has terminals 52a and 52b which are connected to an electronic flash circuit (not shown). A noninflammable electrical connecting member 53 made of coil spring is elastically pressed, at its one end, to the surface of the light emitting portion 52 and, at its other end, to a transparent protector 57, which will be hereinafter described.

The light emitting portion 52 is fixed to a supporting member 54 by means of adhesive material or the like in such state as shown in FIGS. 11 and 12. A fixing member 55 has a vertical portion in which is formed an opening for receiving the supporting member 54, which can be moved in the forward or rearward direction under the guidance of said opening.

A protector 57 is fixed to the fixing member 55 and it constitutes a stationary member. A transparent electrode portion is formed on the inside surface of the protector 57, at the side of the reflector 51, and the transparent electrode portion is connected to a trigger circuit ( not shown), so that a trigger voltage can be fed through the electrical connecting spring member 53 to the transparent electrode portion by elastically pressed contact of the end of said electrical connecting spring member 53 with the inside surface of the protector 57.

FIG. 11 shows the state where the light emitting portion 52 has been moved to its most forward position against the action of the elastic force of the electrical connecting spring member 53, and the supporting member 54 is held in such most forward position by means of a stopper mechanism (not shown). By disengaging such stopper mechanism, the light emitting portion 52 is moved, with the supporting member 54, in the rearward direction along the guiding opening formed in the fixing member 55, under the action of the elastic force of the electrical connecting spring member 53. The supporting member 54 comes into engagement with an abutment at a predetermined position and thus member 54 is pressed to the predetermined position under the action of the electrical connecting spring member 53, so that the light emitting tube can be easily positioned and stopped at the predetermined position, as shown in FIG. 12. As described above, the transparent conductive portion on the protector 57 and the light emitting portion are constantly pressed together under the action of the electrical connecting spring member 53 even when the light emitting portion 52 is moved in the forward or rearward direction in the reflector, so that the trigger voltage can be constantly fed to the light emitting portion in reliable manner.

Figure 13:
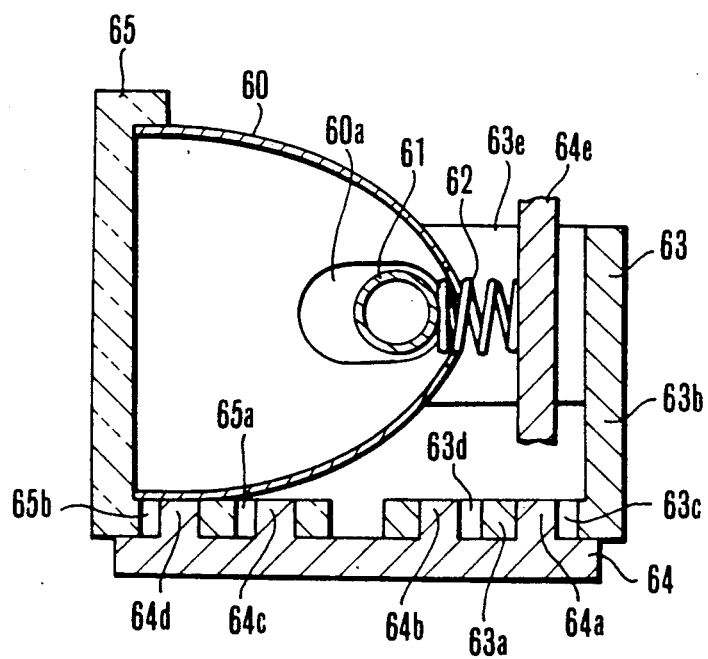
FIG. 13 is a longitudinal sectional view showing a seventh embodiment of the electronic flash device according to the present invention, taken along a center thereof.

FIG. 13 illustrates the seventh embodiment of the present invention. The flash device according to the seventh embodiment includes a reflector 60 having upper and lower surfaces which form a paraboloid and side surfaces in each of which are axially extending slot 60a is formed. A circular opening is formed in the rear end wall of the reflector 60 at a substantially central position thereof. An electrical connecting spring member 62, which will be hereinafter described, is passed through the circular opening into the reflector 61.

A cylindrical light emitting portion 61 is housing in the reflector 60 and extends in parallel with the upper and lower walls thereof. Each end of the light emitting portion 61 passes outwardly of the reflector 60 through the axially extending slots 60a. The vertical size of said slots 60a is slightly larger than the size of the outside diameter of the light emitting portion 61, so that the light emitting portion 61 can move in the forward or rearward direction in the reflector 60 along the longitudinal direction of the slots 60a without making contact with the inside of the slots.

Both end parts of the light emitting portion 61 projecting outwardly of the both sides of the reflector 60 are fixed to outside of a frame portion 63e of a supporting base 63 by means of a rubber member or the like and thus the light emitting portion 61 is supported on the base 63 through the holding rubber member or the like.

The light emitting portion supporting base 63 includes a horizontal sliding portion 63a which extends in the axial direction, a vertical portion 63b which stands from the rear end of the sliding portion 63a, and a frame portion 63e integrally formed at the upper end of said vertical portion 63b. Sliding portion 63a is slidably supported in axial direction on a base 64 which is stationary relatively to the light emitting portion supporting base 63. The sliding portion 63a has two slots 63c and 63d which extend in the axial direction and are aligned on a line. THe base 64 has pins 64a and 64b projecting thereon, which are arranged to fit into said slots 63c and 63d, respectively, so that said sliding portion 63a is movable in the axial direction on the base 64 under guidance of pins 64a and 64b.

the frame portion 63 has a transverse portion 63b extending in transverse direction (in parallel with the light emitting portion 61) and two arms 63e projecting forwardly from the both ends of the transverse part in parallel with each other. Each of these two arms 63e has a semi-circular recess (not shown) formed at its forward end, which is arranged to support the light emitting portion 61. The base 64 has a vertical portion 64e positioned at the front of the vertical portion 63b of the light emitting portion supporting base 63 and the above-mentioned pins 64a and 64b project therefrom.

A noninflammable electrical connecting spring member 62 made of a coil spring is disposed between the vertical portion 64e of the base 64 and the light emitting portion 61. The electrical connecting spring member 62 is elastically pressed, at its forward end, to a mesa coating formed on the outside of the light emitting portion 61 in the reflector 60 and, at its rear end, to the vertical portion 64e of the base 64. An electrical conductive part is formed on the vertical portion 64e to connect the electrical connecting spring member 62 with a trigger circuit. Thus, a trigger voltage can be applied from a trigger terminal (not shown) through the electrical conductive part and the connecting spring member to the light emitting portion 61.

A stopper mechanism (not shown) is arranged on the light emitting portion supporting base 63 to stop the light emitting portion 61 at a predetermined position relative to the reflector 60.

The light emitting portion supporting base 63 constantly receives an elastic force tending to push the base in the forward direction under the action of the electrical connecting spring member 62. Accordingly, the light emitting portion 61 is constantly urged to its most forward position in its movable range in the reflector 60. Under such conditions, the light emitting portion can be stopped at any position by means of a stopper member (not shown).

A protector 65 made of transparent material is fixed to the reflector 60. The protector 65 has a horizontal portion in which are formed two slots 65a and 65b which are aligned on a line. The base 64 has pins 64c and 64d projecting therefrom, which are arranged to fit in the slots 65a and 65b, respectively, so that said protector 65 is movable, with the reflector 60, in forward and rearward directions under guidance of said pins 64c and 64d. The protector 65 and the light emitting portion supporting base 63, which form two moving elements movable in the axial direction on the base 64, are connected together by a connecting member (not shown) so that the two moving elements produce relative movement while holding a predetermined relation to each other.

In the electronic flash device as shown in FIG. 13, the supporting base 63 which supports the light emitting portion 61 is always pushed in the forward direction on the base 64 by means of the electrical connecting spring member and it can be moved from such forward position in the rearward direction, so that the light emitting portion 61 supported by the supporting base 63 is movable in forward or rearward direction along the slots 60a in the reflector 60. Furthermore, the protector 65 connected to the light emitting portion supporting base 63 is moved in the forward or rearward direction while holding the predetermined relation to the movement of said base 63. By using the above-mentioned construction in which the light emitting portion 61 and the reflector 60 are so connected that they produce relative movement while holding a predetermined relation to each other, it is possible to decrease the amount of movement of the light emitting portion 61. It is also possible to adjust the elastic force of the electrical connecting spring member 62 acting against the light emitting portion 61 and the base 64, which is a stationary member, within a predetermined force range, whereby it becomes possible to apply the trigger voltage in more reliable manner. Furthermore, the mechanism in which two moving elements are moved relative to each other enables to change the reflecting angle for a wider range by a smaller stroke of movement.

The description has been provided of the embodiments in which the light emitting portion or the reflector is moved to its most forward or most rearward position. It is, however, possible to effect the electronic flash photographing at any position between the most forward position and the most rearward position, and even in such case it is possible to feed the trigger voltage by the pressure contact obtained by the electrical connecting spring member.

It will be understood that the electrical connecting member and/or the light emitting portion supporting base are not to be limited to the forms as shown in the above-described embodiments and various modifications and changes may be made by those skilled in the art. As is clear from the above explanation the present invention provides a flash device including a light emitting portion, a reflector, means for producing relative movement between the light emitting portion and the reflector, and an elastic conductive member for feeding a trigger voltage to the light emitting portion to energize the same. In this flash device, there is no danger owing to deflection of a lead wire in the reflector which may occur in the case of the construction in which a mesa coating of the light emitting portion and a trigger terminal on the reflector are connected with each other by means of the lead wire. Furthermore, it is possible to constantly feed a trigger voltage to the light emitting portion in a reliable manner even when the light emitting portion and the reflector produce relative movement in forward or rearward direction along an axis of the flash device, while there is no danger of causing damage or the like of the lead wire and trouble owing to such damage. Thus, the present invention provides an electronic flash device of variable illuminating angle type which has high strength and high durability.

What is claimed is:

1. A flash device comprising:
   (A) a light emitting portion;
   (B) a reflector for reflecting a light emitted by said light emitting portion;
   (C) means for producing relative movement between said light emitting portion and said reflector;
   (D) an elastic electrical connecting member connected from outside of the reflector to said light emitting portion to feed a trigger voltage to said light emitting portion to energize said light emitting portion, wherein said electrical connecting member comprises a spring;
   (E) first supporting means for supporting said spring, said first supporting means being arranged to move relative to said light emitting portion; and
   (F) second supporting means for supporting said light emitting portion, said second supporting means having an opening for passing said spring to a position between said light emitting portion and said first supporting means, wherein said first supporting means comprises an entering portion arranged to enter the opening.

2. A flash device according to claim 1, wherein said electrical connecting member is arranged to elastically make pressure contact with said light emitting portion.

3. A flash device according to claim 1, wherein said spring is of a coil spring type.

4. A flash device according to claim 1, wherein said electrical connecting member is made of noninflammable material.

5. A flash device according to claim 1, wherein said reflector includes an opening for passing said electrical connecting member into the inside of said reflector.

6. A flash device according to claim 1, wherein said means for producing relative movement between said light emitting portion and said reflector comprises means for moving said light emitting portion.

7. A flash device according to claim 6, wherein said means for producing relative movement between said light emitting portion and said reflector further comprises means for moving the reflector.

8. A flash device according to claim 1, wherein said means for producing relative movement between said light emitting portion and said reflector comprises means for moving said reflector.

9. A flash device according to claim 1, wherein said first supporting means supports said electrical connecting member.

10. A flash device according to claim 9 wherein said first supporting means is arranged to produce movement, together with said second supporting means, of said light emitting portion relative to said reflector 11. A flash device according to claim 1, wherein said second supporting means includes an opening for passing said electrical connecting member therethrough.

12. A flash device comprising:
(A) a light emitting portion;
(B) a reflector for reflecting a light emitted by said light emitting portion;
(C) means for producing relative movement between said light emitting portion and said reflector in an axial direction of an illuminating light of said flash device;
(D) an elastic electrical connecting member connected from outside of the reflector to said light emitting portion to feed a trigger voltage to said light emitting portion to energize said light emitting portion, wherein said electrical connecting member comprises a spring;
(E) first supporting means for supporting said spring, said first supporting means being arranged to move relative to said light emitting portion; and
(F) second supporting means for supporting said light emitting portion, said second supporting means having an opening for passing said spring to a position between said light emitting portion and said first supporting means, wherein said first supporting means comprises an entering portion arranged to enter the opening.

13. A flash device according to claim 12 wherein said first supporting means comprises a protector disposed at a front of an illuminating opening of said flash device.

14. A flash device according to claim 12 wherein said spring comprises means for positioning said means for producing relative movement between said light emitting portion and said reflector.

15. A flash device according to claim 12, wherein said electrical connecting member comprises a coil spring.

* * * * *

UNITED STATES PATENT AND TRADEMARK OFFICE
CERTIFICATE OF CORRECTION

PATENT NO. : 5,050,044
DATED : September 17, 1991
INVENTOR(S) : Yoshinobu Shibayama It is certified that error appears in the above-identified patent and that said Letters Patent is hereby corrected as shown below:

COLUMN 1

Line 20, change "known" to --usual--; and
    Line 45, change "variable" to --a variable--.

COLUMN 2

Line 57, change "relatively" to --relative--; and
    Line 61, change "relatively" to --relative--;

COLUMN 3

Line 16, change "in" (second occurrence), to --in the--;
    Line 18, change "opening 1bhaving" to --opening 1b having--;
    Line 25, delete "said";
    Line 28, change "in" to --in the--;
    Line 45, change "portion a" to --portion 4a--;
    Line 49, change "in" to --in the--; and
    Line 53, change "in" to --in the--.

COLUMN 4

Line 39, change "in" to --in the--; and
    Line 40, change "tube 4" to --tube 2--.

UNITED STATES PATENT AND TRADEMARK OFFICE
CERTIFICATE OF CORRECTION

PATENT NO. : 5,050,044
DATED : September 17, 1991
INVENTOR(S) : Yoshinobu Shibayama It is certified that error appears in the above-identified patent and that said Letters Patent is hereby corrected as shown below:

COLUMN 5

Line 12, change "in" to --in the--; and
Line 36, change "member 3" to --member 13--.

COLUMN 6

Line 27, "nonimflammable" to --noninflammable--.

COLUMN 8

Line 5, change "slidable direction" to --slidable on the horizontal portion 45a of the base 45 in the direction--.

COLUMN 9

Line 12, change "and" to --end--;
Line 21, "the in" should read --in the--; and
Line 38, change "illustrated" to --illustrate--.

COLUMN 10

Line 30, change "are" to --an--;
Line 35, change "reflector 61" to --reflector 60--;
Line 36, change "housing" to --housed--;
Line 60, change "in" to --in the--;
Line 61, change "relatively" to --relative--; and
Line 64, change "THe" to --The--.

UNITED STATES PATENT AND TRADEMARK OFFICE
CERTIFICATE OF CORRECTION

PATENT NO. : 5,050,044

DATED : September 17, 1991

INVENTOR(S) : Yoshinobu Shibayama

It is certified that error appears in the above-identified patent and that said Letters Patent is hereby corrected as shown below:

<u>COLUMN 11</u>

Line 1, change "the" to --The--; and

Line 62, change "60ain" to --60a in--.

<u>COLUMN 13</u>

Line 33, change "claim 9" to --claim 9,--; and

Line 37, fill line to right margin.

<u>COLUMN 14</u>

Line 1, the line should be indented;

Line 28, change "claim 12" to --claim 12,--; and

Line 31, change "claim 12" to --claim 12,--.

Signed and Sealed this

Thirteenth Day of July, 1993

Attest:

MICHAEL K. KIRK

*Attesting Officer*    *Acting Commissioner of Patents and Trademarks*